US00RE34703E

United States Patent [19]

Zilliox

[11] E Patent Number: Re. 34,703

[45] Reissued Date of Patent: Aug. 23, 1994

[54] INTERLOCKING PLATE AND CUP SET

[76] Inventor: Kent B. Zilliox, 361 Halsey Ave., San Jose, Calif. 95128

[21] Appl. No.: 943,499

[22] Filed: Sep. 11, 1992

Related U.S. Patent Documents

Reissue of:

[64] Patent No.: 5,111,960
Issued: May 12, 1992
Appl. No.: 684,995
Filed: Apr. 15, 1991

[51] Int. Cl.[5] ..... B65D 21/02

[52] U.S. Cl. ..... 220/575; 220/23.4; 220/23.86

[58] Field of Search ..... 220/575, 23.86, 23.4, 220/23.83

[56] References Cited

U.S. PATENT DOCUMENTS

| | | | |
|---|---|---|---|
| D. 227,851 | 7/1973 | Nowland et al. | D7/99 |
| 3,955,672 | 5/1976 | Brundage | 220/8 |
| 4,516,685 | 10/1985 | French | 220/23.4 |
| 4,607,758 | 8/1986 | Stevens | 220/23.4 |

OTHER PUBLICATIONS

House Beautiful Ad. for "Plate Mate" 1989.
Macy's Ad for Acrylic Buffet Trays (1989).

*Primary Examiner*—Joseph Man-Fu Moy
*Attorney, Agent, or Firm*—Robert Samuel Smith

[57] ABSTRACT

An interlocking plate and cup set for use in casual dining so that one can hold a plate and cup with one hand. The plate and cup mate together so that the cup will be securely held to the plate and so that the mated combination can be placed on and removed from a flat surface without separation. The plate is generally flat and has an upper surface with a raised circumferential edge (12) for restraining food. The upper surface of the plate also has a cup-holding support (20) comprising a slot (24) extending in from the edge of the plate. The slot terminates in a concave cup-support area (22). The cup has a relatively broad base (30), a relatively narrow stem (32) extending up from the base, and a relatively broad liquid-holding body portion (34) extending up fro the stem. The body portion has a convex bottom surface (42) facing downward which is shaped to mate with the cup-support area in the plate. The cup support portion of the plate is spaced from the bottom of the plate and the cup's stem is dimensioned such that (a) the cup can be mated with the plate by inserting the stem of the cup into the slot of the plate until the convex underside of the cups body mates with the concave area of the plate, and (b) when the mated combination is placed upon a flat horizontal surface, it will remain mated.

23 Claims, 8 Drawing Sheets

INTERLOCKING PLATE AND CUP SET

Matter enclosed in heavy brackets [ ] appears in the original patent but forms no part of this reissue specification; matter printed in italics indicates the additions made by reissue.

BACKGROUND

1. Field Of Invention

This invention relates generally to dining implements, specifically to plates and cups useful for casual dining.

2. Description Of Prior Art

Many social events require a person to eat while standing. With conventional plates and cups, one is force to either stand near a table so as to have a place to place the cup when not in use, attempt to balance the cup on the plate, the plate on the cup, or eat first and drink later.

Some plate designs attempt to solve this problem by providing a place for the cup or glass to be set or clipped onto the plate. However the stability of the plate and cup arrangement is so poor that a slight bump usually will tip the glass or cup over. Also, one cannot set the plate down on a table without disengaging the cup (or glass) fron the plate. Examples of such arrangements are the cup-holding plates in U.S. Pat. Nos. 4,607,758 to Stevens (1986) and 4,5126,685 to French (1985), and UK patent application 2,078,493 to Francis (1982). Nowland and Selvin, in U.S. Pat. No. Des. 227,851 (1973) shows another cup-holding plate, but this has an elongated handle below the plate, also making it impossible to set down.

OBJECTS AND ADVANTAGES

Accordingly, several objects and advantages of the invention are as follows: to provide means for enabling one to eat and drink conveniently and concurrently while standing or seated, even without a table or other surface to place a plate and cup or glass, to provide an improved plate and cup set which can be used for casual dining, which is very stable in use so that accidental bumps will not tip over the set, and which can be placed on tables without tiping over the glass or cup. Other objects are to provide a more stable cup and plate set which one can hold with one hand and can hold with confidence while walking.

Further objects and advantages will become apparent from a consideration of the ensuing description and the accompanying drawings.

DRAWING FIGURES

FIG. 1 is a perspective view of a plate according to the invention. FIG. 1A is a top view of the plate of FIG. 1. FIG. 1B is a side sectional view taken along the line 1B—1B of FIG. 1A. FIG. 1C is a bottom view of the plate of FIG. 1.

FIG. 2 is a perspective view of a cup according to the invention which is designed to mate with the plate of FIG. 1A. FIG. 2A is a side view of the cup of FIG. 2. FIG. 2B is a side sectional view taken along the line 2B—2B of FIG. 2A.

Figure 1:
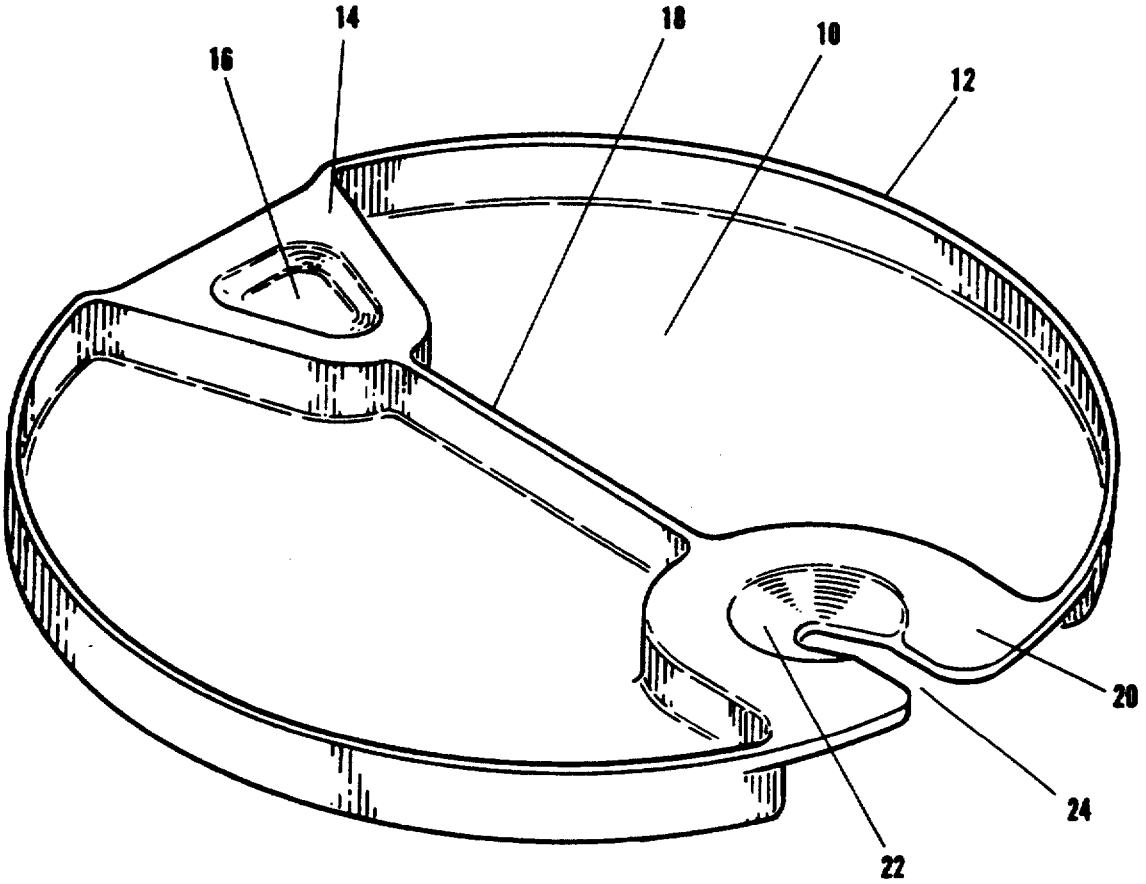
Figure 1A:
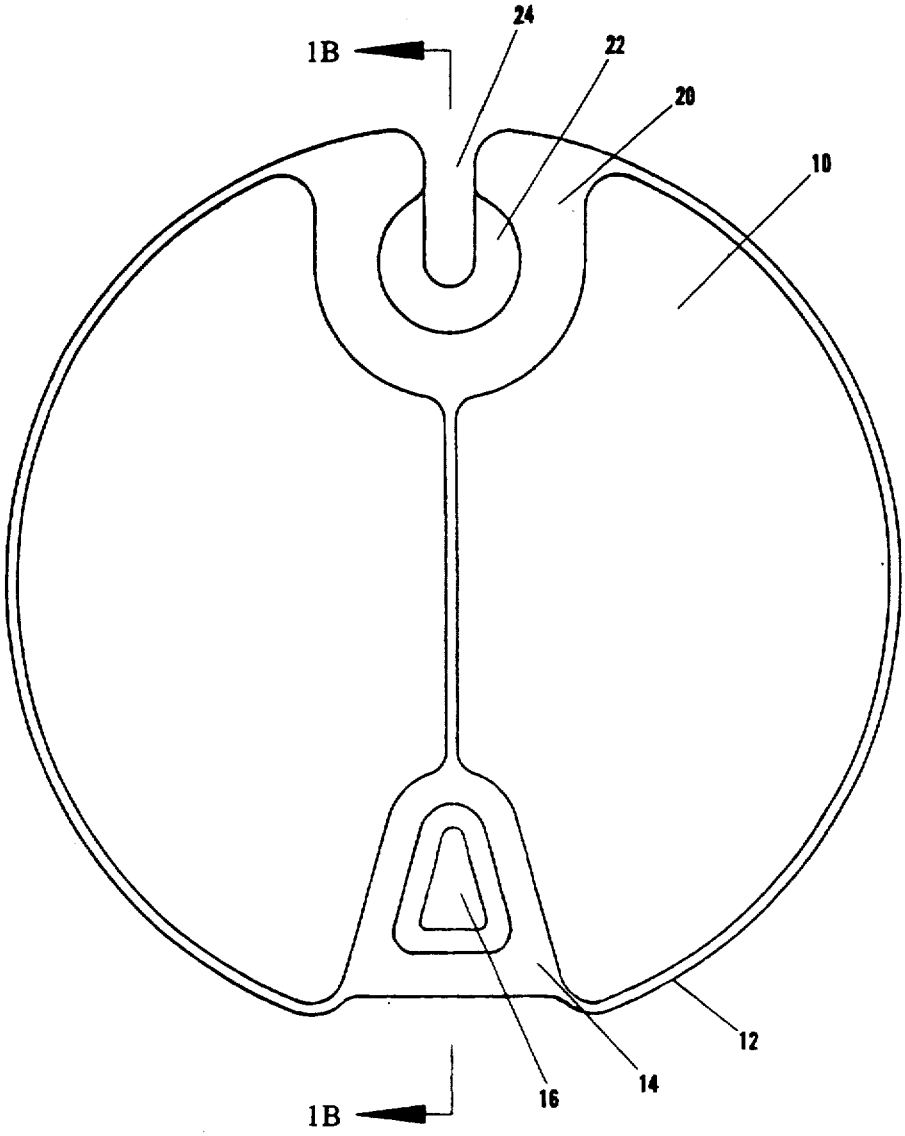
Figure 1B:
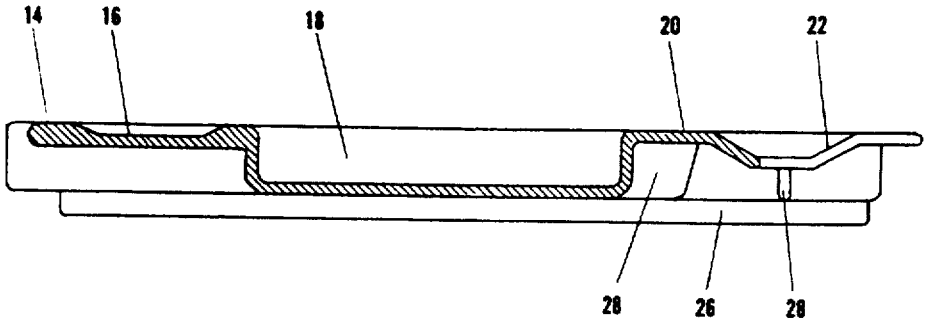

| DRAWING REFERENCE NUMERALS | |
|---|---|
| 10 bottom of plate | 12 edge of plate |
| 14 handhold | 16 thumb depression |
| 18 web divider | 20 cup-holding support |
| 22 cup-receiving depression | 24 stem guide |
| 26 plate support ridge | 28 cup area support rib |
| 30 flat bottom of cup | 32 stem |
| 34 body of cup | 36 upper part of cup body |
| 38 lower cup body | 40 shoulder of cup |
| 42 bottom of cup | |

SUMMARY

In accordance with the invention, an interlocking plate and cup set comprises a generally flat plate having an upper surface with a raised circumferential edge for restraining food and a cup-holding support adjacent the edge. A slot is formed in the support and extends in from the edge and terminates in a concave cup-receiving depression. The cup has a relatively broad base, a relatively narrow stem, and a relatively broad liquid-holding body portion. The body portion has a convex bottom surface which is shaped to mate with the cup-receiving area in the plate. The cup and plate are dimensioned such that the cup can be mated with the plate by inserting the stem of the cup into the slot of the plate until the convex underside of the cups body mate's with the concave area of the plate, and such that the mated combination can be placed upon a flat horizontal surface and still remain mated.

DESCRIPTION OF PLATE—FIGS. 1—1C

Figure 1C:
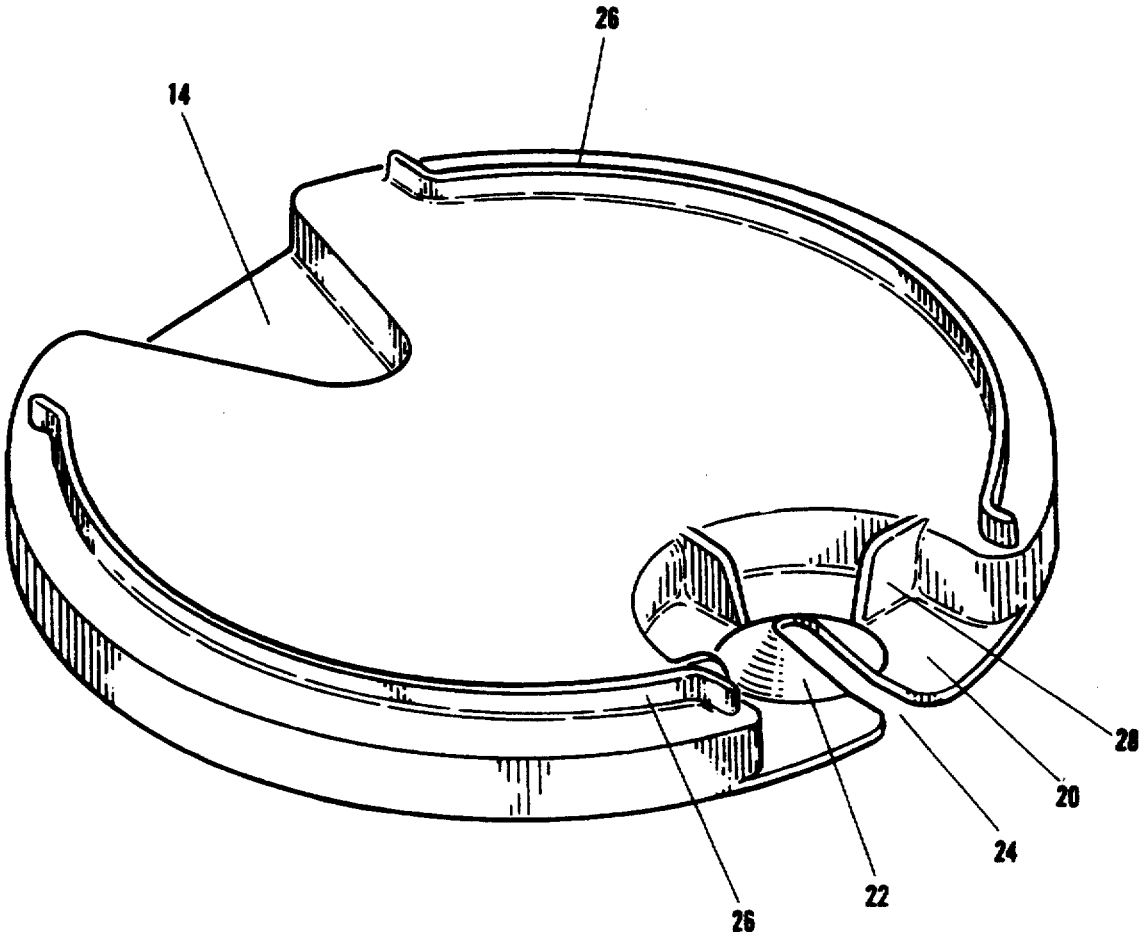

A plate in accordance with the invention is shown in perspective, top (plan), side-sectional, and bottom views in FIGS. 1 to 1C.

The plate comprises a flat bottom 10 with an upstanding circumferential edge 12. One side of the plate has a handhold 14 which is a generally triangular platform extending up from bottom 10 and which has a generally triangular thumb depression 16 which extends down from handhold 14.

A web, divider, or rib 18 extends diametrically across the plate from handhold 14 to a cup-holding support 20. Divider 18 is flat, thin, and extends vertically up from bottom 10.

Support 20 comprises another platform extending up from bottom 10 and which has an upper surface with a flat outer portion with a generally circular, concave cup-receiving depression 22. The surface of depression 22, when proceeding from its outer edge to its center, is conical. Support 20 is generally semicircular in shape and is joined to handhold 14 by divider 18. Support 20 also includes a slot or stem guide 24 extending in from the plate's edge to the center of depression 22.

Figure 6:
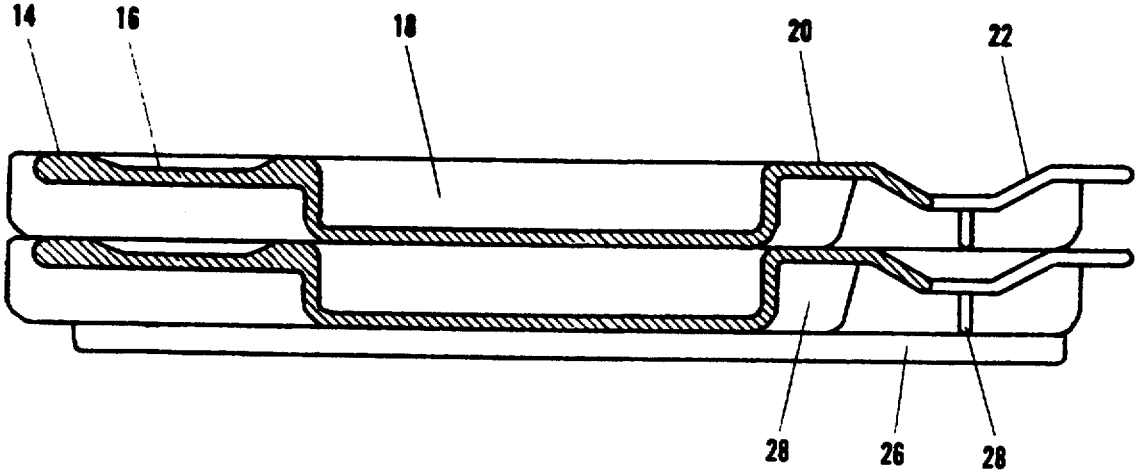
FIG. 6 is a side sectional view showing several plates stacked together.

As shown in the bottom view (FIG. 1C), the bottom of the plate has a pair of circumferential or annular support ridges or ribs 26. These ridges raise the height of the plate so that the cup will remain engaged with the plate when the combination is placed on a table, but also enable the plates to be stacked, as shown in FIG. 6. Handhold 14 appears as a triangular depressed area and cup-holding support 20 appears as an elongated semicircular depressed area with a plurality of inwardly extending support ribs 28. The bottom and upper surfaces are designed to conformingly mate so that a plurality of plates can be stacked, provided support 20 or handhold 14 of the upper plate is aligned with either support 20 or handhold 14 of the lower plate.

DESCRIPTION OF CUP—FIGS. 1—1C

Figure 2:
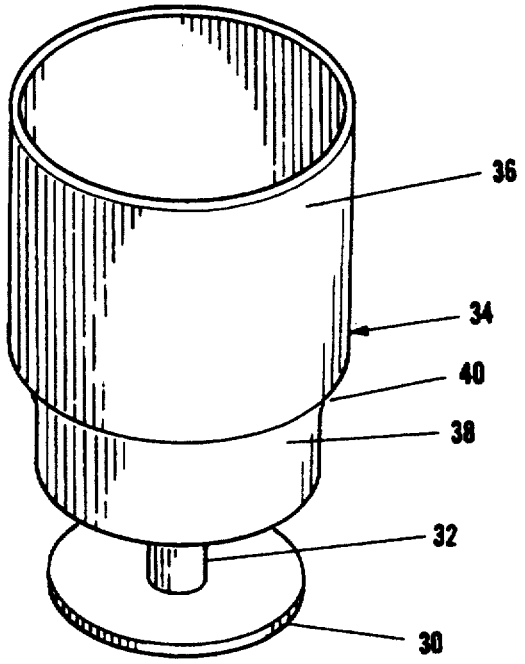
Figure 2A:
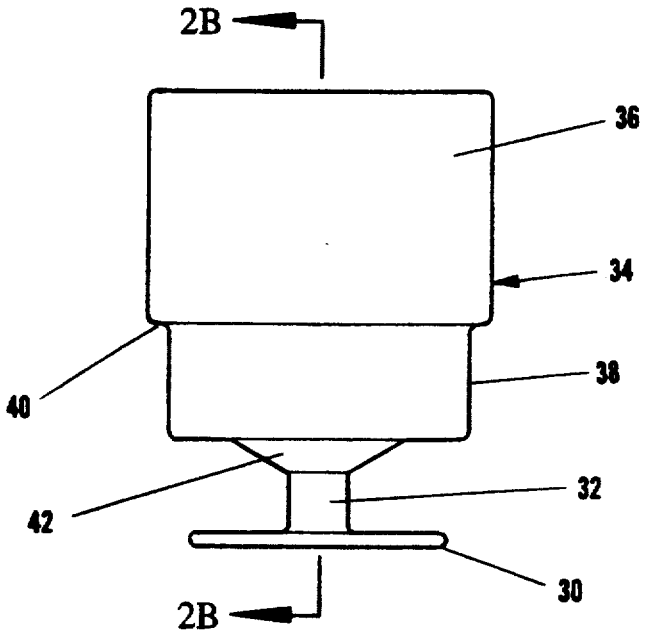
Figure 2B:
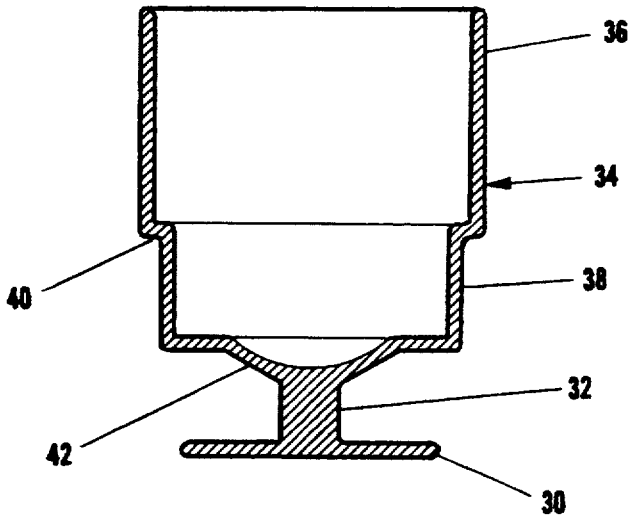

A mating cup in accordance with the invention is shown in perspective, side, and side-sectional views in FIGS. 2 to 2B.

The cup comprises a flat flangelike bottom 30 with an upstanding stem 32, and a body or liquid-holding portion 34.

Figure 5:
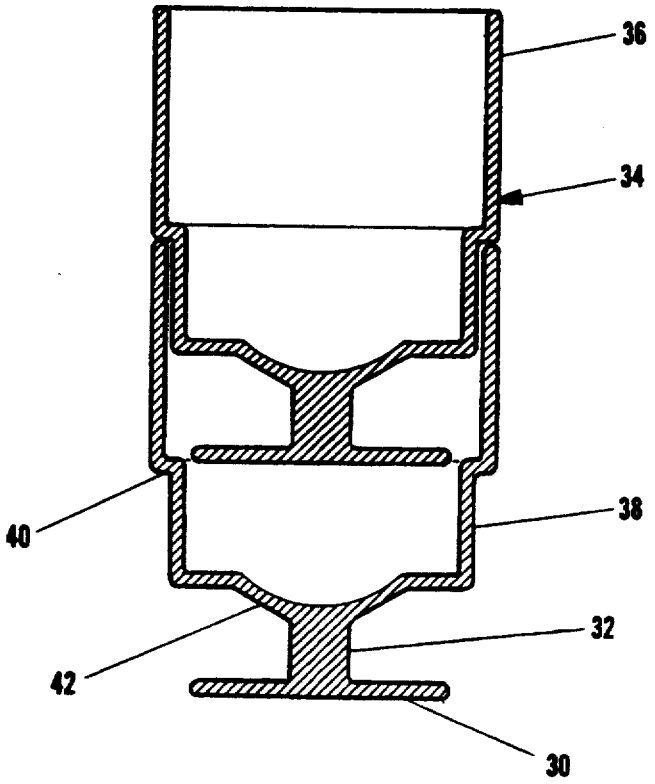
FIG. 5 is a side sectional view showing several cups stacked together.

As shown in FIGS. 2A and 2B, portion 34 comprises a cylinder with a closed bottom and an open top, a circular outer wall with a stepped configuration comprising a larger upper part 36 and a narrower bottom part 38. The diameter of bottom 30 is the same as that of part 38 and slightly less than the inside diameter of part 36, such that the cups can be stacked by inserting the bottom and lower part of one cup into the upper part of another cup, as shown in FIG. 5. The transisiton between upper part 36 and lower part 38 forms a downwardly facing shoulder 40 which will meet the upper edge of part 36 to limit insertion and support the upper cup when cups are mated.

Bottom part 38 has a bottom surface 44 with a flat outer portion and a concave (when seen from below) inner portion 44 which is conical (straight from outer portion to stem) and is shaped to conformingly mate with depression 22 (FIG. 1) of the plate. Stem 32 (FIG. 2A is dimensioned to slide loosely in stem guide 24 (FIG. 1).

DIMENSIONS AND MATERIALS

Preferably the cup and plate are each molded of a single integral piece of plastic, preferably acrylic. In one embodiment the plate was 25.3 cm in diameter, bottom 12 was 25 mm high, support 20 extended in 75 mm from the edge, stem guide 24 was 45 mm long and 13 mm wide, and depression 22 was 8 mm deep. The cup was 103 mm high, upper part 36 was 75 mm in outside diameter and 68 mm in inside diameter, lower part 38 was 70 mm in outside diameter, and stem 32 was 12 mm in diameter. The inner diameter of upper part 36 is large enough to receive a standard beer or sweet beverage can.

OPERATION

Figure 3A:
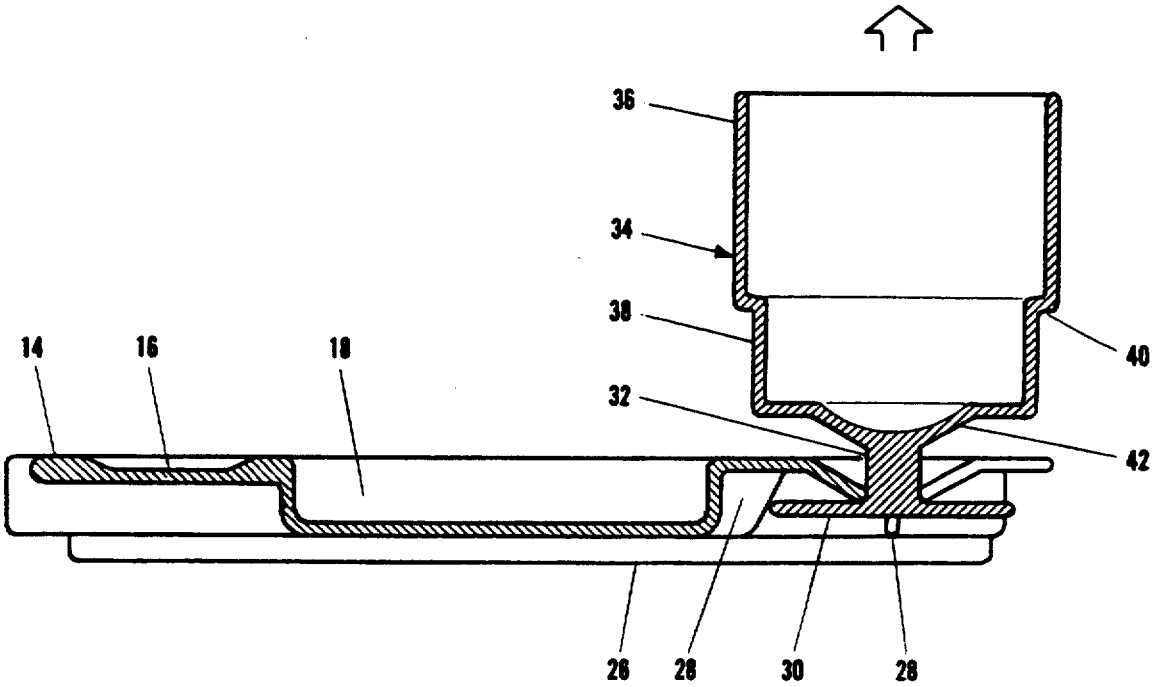
FIG. 3A is a side sectional view of the plate and cup just prior to mating.

As stated, the cups and plates can be stored in respective stacks (FIGS. 5 and 6, respectively) since each plate (or cup) is designed to mate conformingly with similar plates (cups) above or below. To use the set, a user takes a plate and a cup from the respective stacks and mates or assembles the cup and plate together by inserting stem 32 of the cup into stem guide 24 of the plate until the stem meets the end of the guide, as shown in FIG. 3A. Note that bottom 42 is above depression 22 at this time: the user is still holding the cup. The plate can be resting on a flat surface or held with one hand while doing this.

Figure 3B:
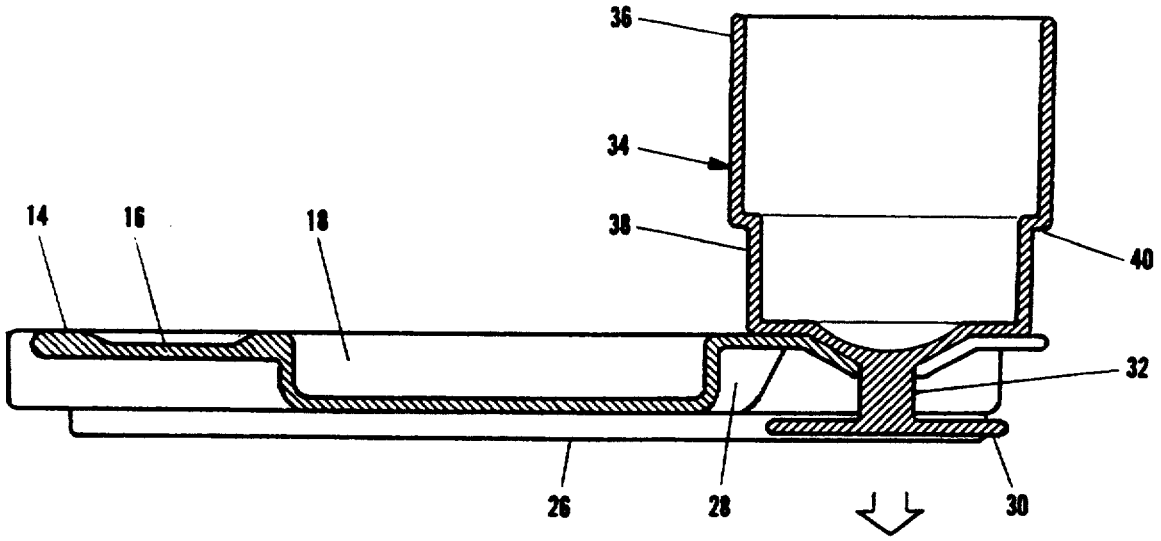
FIG. 3B is a side sectional view of the mated plate and cup.

The user then lowers the cup until bottom 42 meets depression 22 and the cup rests on the plate, as shown in FIG. 3B. The cup will be securely held in the plate because bottom 42 will conformingly mate with depression 22 and stem guide 24 will hold stem 32 from moving in or sideways. If the cup is disturbed, its bottom flange 30 will contact one of bottom ribs 28, thus keeping the cup from disengaging from the plate. The mated set can thus be carried, placed upon a flat surface, lifted again, loaded with solid food on the plate and liquid in the cup, etc., without separating. Note (FIG. 3A) that bottom 30 of the cup is higher than the bottom of ridges 26 so that when the mated set is placed upon a flat surface, the cup will not contact the surface and thus will not be disturbed.

Alternatively the cup and plate can each be loaded individually with food and then mated.

Figure 4:
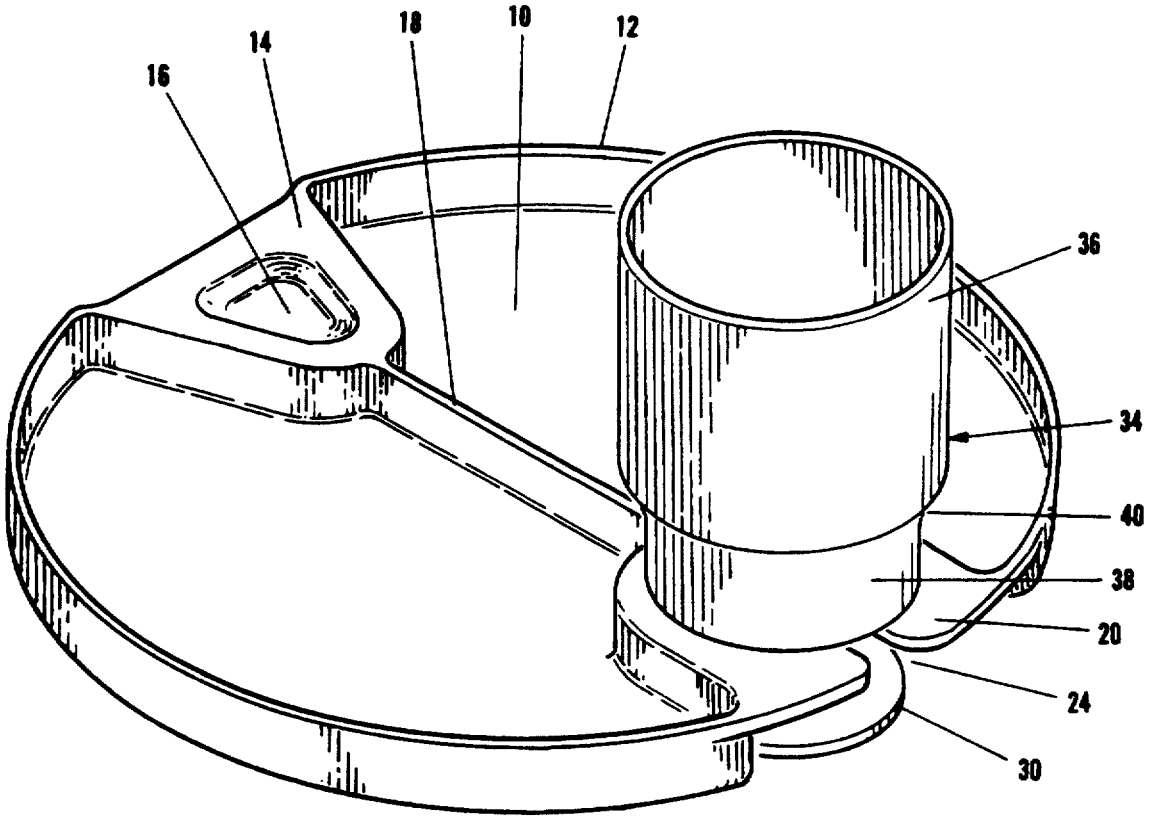
FIG. 4 is a perspective view of a mated cup and plate according to the invention.

In either case, the mated cup and plate form a stable, aesthetic set, as shown in FIG. 4. The set can be easily lifted by first grasping the plate by placing one's finger's under 14 with the thumb in 16. The set then can be securely held for eating and drinking while standing since the cup and plate can be held with one hand, freeing the other hand to drink, use a fork or spoon, manually pick up comestibles from the plate, or drink. The cup can easily be lifted out of its slot, brought to the lips, and replaced in its slot to free the other hand, all while holding the plate with the first hand.

SUMMARY, RAMIFICATIONS, AND SCOPE

The reader will thus see that, according to the invention, I have provided a mateable cup and plate set which provides a means for one to eat and drink conveniently and concurrently, while standing or seated and without a table or place to set down a plate and cup or glass. It also facilitates eating and drinking during casual dining. Further it provides a matable cup and plate set which is very stable in use so that accidental bumps will not tip over the cup, which can be placed upon tables without tipping over the cup or glass, which can be held with one hand, and which can be held with confidence while walking.

While the above description contains many specificities, these should not be construed as limitations on the scope of the invention, but as exemplifications of the presently-preferred embodiments thereof. Many other ramifications and variations are possible within the teachings of the invention. For example, glazed ceramic, china, hardwood, or metal can alternatively be used for the cup and plate. The cup and plate can alternatively each be made of separate parts which are cemented, screwed, or otherwise joined together. The cup and plate can have shapes other than circular, such as square, pentagonal, hexagonal, polygonal, etc. The bottom of the cup and the mating depression of the plate can be curved along the radii from edge to center, rather than straight. The cup-holding area of the plate can be convex and the bottom of the cup concave, rather than vice-versa as shown. The dimensions given above are exemplary and can be made smaller, larger, or in any combination.

Thus the scope of the invention should be determined by the appended claims and their legal equivalents, and not by the examples given.

I claim:

1. A mating plate and cup set comprising:

a plate having upper and lower major surfaces which face in opposite directions, said upper and lower surfaces being joined by [an] *a circumferential* edge, said plate having a notch extending in from [an] *said* edge [thereof] for receiving [the] *a* stem of a cup, said notch [terminating] *having a termination* at a location on said plate spaced in from said edge,

[the] *a* portion *of said upper surface* of said plate surrounding [the] *said* termination of said notch, [when viewed from a direction orthogonal to said upper surface thereof, comprising] *having* a concavity which surrounds said termination of said notch, said concavity having a [predetermined] *concave* shape and a given dimension [when measured in a direction parellel to said upper surface of said plate], and a mating cup having a body which is capable of carrying a quanity of liquid, a base which is below said [base] *body* and which is capable of supporting said cup in a stable manner on a flat, horizontal surface, and a stem [interconnecting] *having a lower end connected to said base and an upper end connected to a bottom surface of* said body [and said base], said stem having an axis and being narrower than said body and said base and [able] *dimensioned* to slide [in] *into* said notch of said plate,

[the] *said* bottom surface of said body having a peripheral area which is substantially flat and perpendicular to said axis of said stem, and a downwardly projecting convex portion which is surrounded by said peripheral area and surrounds and is adjacent to said stem, said convex portion [extending down from said peripheral area and] having a [predetermined] *convex* shape which conformingly mates with said [concavity] *concave shape* when said cup is mated with said plate by inserting said stem into said notch and positioning said [inner] *convex* portion of said cup into said concavity of said plate,

[said peripheral and inner portions of] *said stem having a length and* said bottom surface of said plate [being dimensioned] *having an inner portion peripheral to and adjacent to said notch being shaped such that*, when said plate and cup are mated, [and when measured in said direction parallel to said upper surface of said plate, such that] said [peripheral] *inner* portion will [rest on] *conformingly mate* to an [area] *upper surface* of said [plate] *base* surrounding said [concavity thereof] *lower end of said stem,* whereby said plate and cup will remain very stable and said cup will resist tipping when said cup and said plate are mated.

2. The set of claim 1 wherein *an outer boundary of* said cup and *said circumferential edge of* said plate are circular in shape[, in plan configuration].

3. The set of claim 1 wherein [the] *said* bottom *surface* of said plate [has] *comprises* a [ridge] *rib* partly surrounding said notch, said [ridge] *rib* being dimensioned to contact said *uppersurface of said* base of said cup when said cup and plate are mated and said cup is tipped.

4. The set of claim 1 wherein said cup has a larger diameter upper portion and a smaller diameter lower portion, such that a plurality of cups can be stacked by inserting the base and lower portion of an upper cup into the inside of the upper portion of a lower cup.

5. The set of claim 1 wherein said plate has a handhold platform with a thumb notch on a side thereof opposite said notch.

6. The set of claim 1 wherein said upper surface of said plate has a raised circumferential edge for restraining food, when placed upon said upper surface, from falling off the edge of said upper surface.

7. The set of claim 1 wherein said stem of said cup has a length, and said base of said cup has a thickness, which are [short enough in height such] *selected to provide* that when said cup is mated with said plate by inserting said stem into said notch and allowing said bottom surface of said body of said cup to rest on [the area of] said upper surface of said plate surrounding the termination of said notch, said bottom of said plate can be placed on a horizontal surface *of a support* without said bottom surface of said [bottom of said] body of said cup being forced [up and] away from said top surface of said plate, whereby said plate and cup, when mated, can be placed on a horizontal surface and will remain mated.

8. A mating plate and cup set, comprising:

a plate having upper and lower [major] surfaces which face in opposite directions, said upper and lower surfaces being joined by an edge[,]:

said plate having a notch extending in from [an] *said* edge [thereof] for receiving the stem of a cup, said notch [terminating] *having a termination* at a location on said plate spaced in from said edge, said [bottom] *lower* surface of said plate having a bottom annular ridge [for supporting] i with a height providing that said bottom surface *be supported* at [a given] *said* height when said plate is placed on a horizontal support, a mating cup having a body which is capable of carrying a quantity of liquid, a base which is below said [base] *body* and which is capable of supporting said cup in a stable manner on a flat, horizontal surface, and a stem [interconnecting] *having a top end connected to* said body and *a bottom end connected to an upper surface of* said base, said stem having an axis and being narrower than said body and said base and [able] *dimensioned* to *engagingly* slide [in] *into* said notch of said plate, said body having a bottom surface which faces *said upper surface of* said base, said stem having a length, and said base having *a* thickness, [which are short enough in height such] *selected to provide* that when said cup is mated with said plate by inserting said stem into said notch and allowing said bottom surface of said body of said cup to rest on [the] *an* area of said upper surface of said plate surrounding [the] *said* termination of said notch, said bottom ridge of said plate can be placed on a horizontal surface without said bottom surface [of said bottom] of said body of said cup being forced up and away from said top surface of said plate, whereby said plate and cup, when mated, can be placed on a horizontal surface and will remain mated.

9. The set of claim 8 wherein *an outer boundary of* said cup and *circumferential edge of* said plate are circular [in shape, in plan configuration].

10. The set of claim 8 wherein [the bottom] *said lower surface* of said plate has a [ridge] *rib* partly surrounding said notch, said [ridge] *rib* being dimensioned to contact said *upper surface of said* base of said cup when said cup and *said* plate are mated and said cup is tipped.

11. The set of claim 8 wherein said cup has a larger diameter upper portion and a smaller diameter lower portion, such that a plurality of cups can be stacked by inserting the base and lower portion of an upper cup into the inside of the upper portion of a lower cup.

12. The set of claim 8 wherein said plate has a handhold platform with a thumb notch on a side thereof opposite said notch.

13. The set of claim 8 wherein said upper surface of said plate has a raised circumferential edge for restraining food, when placed upon said upper surface, from falling off the edge of said upper surface.

14. The set of claim 8 wherein the bottom surface of said body of said cup has a peripheral area which is substantially flat and perpendicular to said axis of said stem, and a downwardly projecting convex portion which is surrounded by said peripheral area and surrounds and is adjacent to said stem, said upper surface of said plate having an area which conformingly mates with said bottom surface of said body of said cup.

15. An interlocking plate and cup set, comprising:

a plate comprising a generally flat member having upper and lower [major] surfaces which face in opposite directions, said upper surface of said plate [including] *having* a raised circumferential edge for restraining food, when placed upon said upper surface, from falling off the edge of said upper surface, said upper surface of said plate having a cup support portion, extending in from an edge thereof, said cup support portion being spaced above said bottom surface of said plate, said cup support portion [including] *having* a notch [or slot] extending radially inwardly from said edge of said plate [partially toward the center of said plate], said [slot] *notch* having a termination spaced inwardly from said edge [toward said center thereof, said termination being surrounded by] *and* a mating cup support area in said cup support portion of said upper surface *surrounding said termination,*

[said] *a* cup having a [relatively broad] base *sufficiently broad and* arranged to support said cup when said base is placed upon a flat horizontal support surface, a [relatively narrow] stem *substantially more narrow than said base and having a lower end secured to an upper surface of said base and* extending upwardly from said base, and a [relatively broad] liquid-holding body [porton] extending upwardly from said stem, said body [portion] having a bottom surface facing said base and attached to *an upper end of* said stem, said bottom surface of said body [portion being shaped to ] *having a shape permitting it to* mate with said mating *cup* support [area] *portion* in said upper surface of said plate, said cup support portion of said plate being spaced from said bottom surface of said plate and said stem being dimensioned such that, when said cup *support portion* is mated with said [plate] *bottom surface of said body* by inserting said stem into said [slot] *notch* toward said termination, and said mated plate and cup are placed *with said lower plate surface* upon said flat horizontal surface, [said bottom surface of said plate and will rest upon said flat horizontal surface, yet said bottom surface of said cup will be spaced from said horizontal surface so that] *and* said [plate and said] cup *support section and said bottom body surface* will remain substantially mated.

16. The set of claim 15 wherein said cup *has a boundary* and said plate *has a boundary and said plate and cup boundaries* are circular [in shape, in plan configuration].

17. The set of claim 15 wherein [the bottom] *said lower surface* of said plate has a [ridge] *rib* partly surrounding said notch, said [ridge] *rib* being dimensioned to contact said base of said cup when said cup and plate are mated and said cup is tipped.

18. The set of claim 15 wherein said [plate] *cup* has a larger diameter upper portion and a smaller diameter lower portion, *dimensioned* such that a plurality of cups can be stacked by inserting the base and lower portion of an upper cup [into the] inside [of the] *said* upper portion of a lower cup.

19. The set of claim 15 wherein said plate has a handhold platform with a thumb notch on a side thereof opposite said notch.

20. The set of claim 15 wherein the bottom surface of said body of said cup has a peripheral area which is substantially flat and perpendicular to said axis of said stem, and a downwardly projecting convex portion which is surrounded by said peripheral area and surrounds and is adjacent to said stem, said upper surface of said plate having an area which conformingly mates with said bottom surface of said body of said cup.

*21. A mating plate and part set which comprises:* a plate member with an upper plate surface and a lower plate surface substantially parallel to one another and forming an edge and a notch in said edge extending from said edge to a termination distal from said edge;

said upper plate surface including a concavity having a concave shape and peripheral to said termination;

said lower plate surface including a base support area adjacent to said termination;

a part member including a base with an upper base surface and a lower base surface and a base thickness between said upper base surface and said lower base surface;

said part member including a stem having a lower end secured to said upper base surface and an upper end extending away from said upper base surface;

said part member having a part surface with a shape and facing said upper base surface and secured to an upper end of said stem;

said shapes of said part surface, said upper base surface, said concavity and said base support areas, said stem length and base thickness, all selected in operable combination with one another to provide that said part member may be detachably engaged with said plate member such that when said stem is positioned in said termination, said part surface conformingly mates to said concavity, and said upper base surface conformingly mates with said base support area thereby providing stable support to said part member by said plate member.

*22. A set as in claim 21 wherein said lower base surface is flat and said lower plate surface has areas that are flat and said base thickness is selected such that said lower base surface is coplanar with said lower plate surface when said body and plate members are mated permitting said plate member and part member to be supported on a flat surface.*

*23. A set as in claim 21 wherein said base support area includes a plurality of upstanding ribs, each said rib having two sides bounded by one edge secured to said base support area and another edge contoured to mate with said upper base surface.*

* * * * *